Aug. 19, 1958  S. C. TURKENKOPH  2,847,925

SNAP-ON SHIELD FOR AUTOMOBILE VENTILATORS

Filed Feb. 3, 1956

INVENTOR.
SYLVANUS C. TURKENKOPH
BY
McMorrow, Berman + Davidson
ATTORNEYS

United States Patent Office 2,847,925
Patented Aug. 19, 1958

2,847,925
SNAP-ON SHIELD FOR AUTOMOBILE VENTILATORS

Sylvanus C. Turkenkoph, Sarasota, Fla.

Application February 3, 1956, Serial No. 563,271

2 Claims. (Cl. 98—2)

This invention relates to automobile ventilators, and more particularly has reference to a hood or shield capable of being snapped into place over a conventional ventilator in a manner that will increase the efficiency of the ventilator.

Automobiles of modern construction are generally equipped with elongated ventilators disposed immediately in advance of the vehicle windshield. A ventilator of this type is generally equipped with a grille, and during operation of the vehicle air is caused to flow through the grille, for distribution within the passenger compartment of the vehicle.

It has been found that the distribution of the air within the vehicle is not always uniform, and is affected to some extent by different speeds at which the vehicle is moving. If, for example, the vehicle is being driven at a relatively low speed, a relatively small amount of air is drawn into the vehicle and it is often necessary that the blower associated with the ventilator system be turned on to its maximum extent under these circumstances. At higher speeds the difficulty is not experienced, or at least is reduced measurably.

The present invention, summarized briefly, is an elongated, upwardly inclined deflector or shield, opening toward the front of the vehicle, and adapted to deflect air into the ventilator, to a greater extent than is true when the ventilator is not equipped with the device. The device, in this connection, is so fashioned as to be capable of being snapped into place upon the ventilator, so that modification or redesign of the ventilator or of associated portions of the vehicle body is not required. Still further, the construction permits application of the device to the cowl of the vehicle without requiring special tools or skilled workers.

An important object of the invention is to add to the efficiency of the ventilating system of a vehicle by increasing the volume of air transmitted to the passenger compartment of the vehicle.

A further object is to add to the efficiency with which the ventilating system cools the vehicle interior in hot weather, by improved distribution of the air as well as by the increased volume flowing through the ventilator.

Still another object is to provide a ventilator attachment as stated so designed that when heated air is flowing into the passenger compartment it also will be uniformly distributed over the full area occupied by the passengers, with the distribution being effected with more rapidity and thoroughness than has heretofore been true.

Still another object is to provide a device as stated which will be capable of installation with maximum speed and ease, will provide ventilation in vehicles at low speeds equal to that which is normally obtained at substantially higher speeds, and will be attractively and inconspicuously designed so as to detract in no way from the appearance of the vehicle.

Other objects will appear from the following description, the claims appended thereto, and from the annexed drawing, in which like reference characters designate like parts throughout the several views, and wherein:

Figure 1:
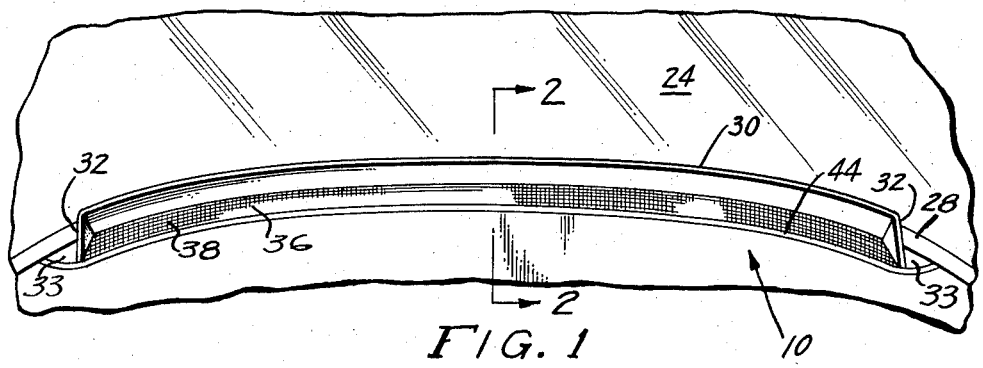
Figure 1 is a fragmentary front elevational view of a vehicle body at the base of the windshield, showing my ventilator attachment in position for use.

Designated generally by the reference numeral 10 is a conventional vehicle, including a cowl 12 having adjacent the base of the vehicle windshield a depending wall 14. The vehicle includes the usual instrument panel 16, and extending downwardly from the instrument panel at the base of the windshield is a fire wall 18 cooperating with wall 14 in defining a conduit 19 for air flowing into the vehicle through the ventilation system thereof.

Instrument panel 16 at its forward edge has an upwardly turned lip 20 engaging in a groove formed in one side of a rubber molding strip 22 having in its opposite side a groove receiving the lower edge of a windshield 24. A trim strip or garnish mold 26 is applied to the inner face of the rubber strip 22, while exteriorly of the vehicle, a trim strip 28 is applied to the outer face of the rubber sealing strip.

Figures 3, 4:
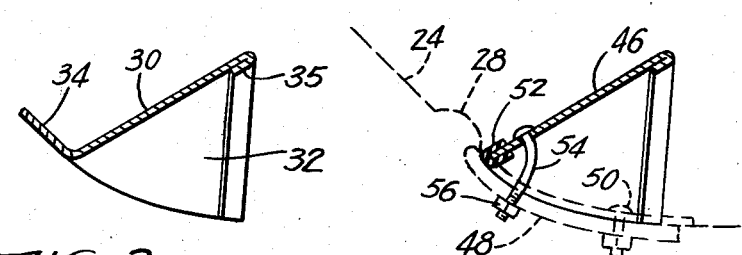
Figure 3 is a still further enlarged transverse sectional view through the ventilator attachment per se.
Figure 4 is a transverse sectional view through a modified form of the device, the vehicle being shown in dotted lines.

The device constituting the present invention has been designated at 30, and comprises an elongated length of metal material which may be curved longitudinally correspondingly to the transverse curvature of the cowl 12 as shown to best advantage in Figure 1. The attachment, at its opposite ends, has end walls 32, preventing escape of air through the ends of the device, and over the full length of the device there is formed upon the rear longitudinal edge thereof an attaching flange or lip 34, which as shown in Figure 3 is obtusely related to the body portion of the device. The forward longitudinal edge of said body portion is preferably rolled or beaded as at 35 to eliminate sharp edges. The end walls 32 each has a flat extension 33, as shown clearly in Figure 1.

If desired, there can be employed a plurality of tongues spaced longitudinally of the device, to be used instead of a continuous flange 34.

In any event, when the device is applied the flange 34 is forced upwardly between the exterior trim strip 28 and the rubber sealing strip 22. In this position of the parts, the body portion is inclined upwardly in a direction forwardly from the back of the ventilator, so as to form an air scoop through which air will pass when entering the ventilating system of the vehicle.

The body of the device is resiliently tensioned in a direction to normally tend toward flexing to a straight condition, thus to permit the body to be snapped into place in engagement with the trim strip 28 and held in place by the cooperating action of the flange 34 and of the resiliency of the material of the body.

A ventilator grille has been designated at 36 and is part of the vehicle construction, said grille having apertures 38 through which air may enter the conduit 19. A sealing strip 40 is interposed between the back edge portion of the grille and fire wall 18, while a front sealing strip 42 is interposed between the front edge portion of the ventilator grille and the wall 14. The usual trim strip 44 is provided, covering the joint between the ventilator grille and cowl.

Figure 2:
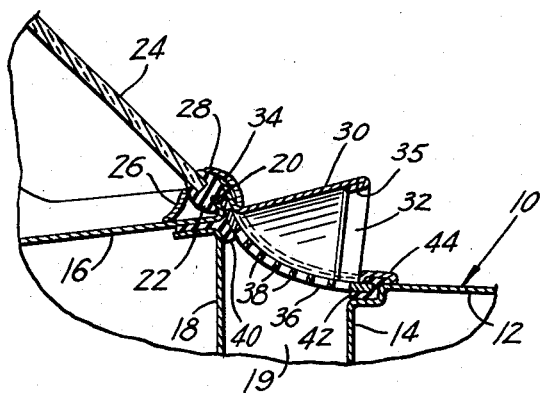
Figure 2 is an enlarged, detail sectional view on line 2—2 of Figure 1.

It will be seen that the device need merely be forced into place in the position illustrated in Figure 2 without requirement of special tools.

The chrome strip 44, in conventional automobile design, extends along the front edge of the ventilator grille 36, and then extends rearwardly at its ends to the base of the windshield, along the ends of the ventilator grille. This strip, accordingly, is disposed where the end walls 32 of the ventilator can be engaged under the same, in many installations.

In the modified construction illustrated in Figure 4, the ventilator body has been designated at 46, and is shown in position overlying a grille 48. In this form of the invention, the end walls of the ventilator body would have outwardly directed flanges, apertured to receive end screws 50, said screws constituting hold-down means whereby the ends of the ventilator shield are secured to the body of the vehicle. Alternatively, the ends of the ventilator can terminate just inwardly from the ends of the ventilator grille, with the screws extending through the grille itself.

Further, in this form of the invention the ventilator body does not have a rearwardly, upwardly inclined flange, and instead at its back edge is provided with a rubber protector strip 52 slotted to receive the back edge portion of the ventilator body.

Additional screws can be employed at selected locations intermediate the opposite ends of the ventilator body, and for example there can be employed one or more bent bolts or screws 54, the heads of which engage against the top surfaces of the ventilator body, with said screws being bent for extension of the shanks thereof through the ventilator grille, after which nuts 56 are applied to the shanks of the bent screws.

It is believed mainly important to note that the ventilator body is so designed as to open forwardly toward the front of the vehicle, immediately above the ventilator grille, in a manner adapted to deflect more air into the ventilator grille than is true of the grille as presently made. It is further important to note that the construction in each instance is such as to permit the device to be connected to the vehicle as an attachment that will blend with the conformation of the vehicle body and of the vehicle ventilator opening, with the device being adapted to be connected swiftly and easily to the vehicle without requirement of special tools or skilled workers. Thus, in the illustrated example the device is shown in one form as a snap-on type, while in the second form it is bolted to the vehicle. Other means for connecting the device to the vehicle can be employed, of course, such as clamps, etc.

When the vehicle is in operation, air is scooped into the ventilator conduit by means of the inclined ventilator body 30 or 46, and it has been found in practice that the construction is such as to cause a greater volume of air to be channeled into the passenger compartment, at a particular rate of speed, than is true of vehicles not equipped with the invention, traveling at the same rate of speed. Further, the device blends in with the lines of the vehicle as shown in Figure 1, and is relatively inconspicuous. The device can of course be made of any of various materials, and can be made of a metal painted the color of this vehicle body. Alternatively, the device can be chrome plated or otherwise treated to enhance the attractiveness thereof.

It is believed clear that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor changes in construction that may be permitted within the scope of the appended claims.

What is claimed is:

1. In an automobile, the combination with a cowl having a depending wall, an instrument panel inwardly of and spaced from said cowl depending wall, a fire wall on the edge of said panel adjacent said cowl wall and forming with the cowl wall a conduit having an inlet opening between said cowl and fire walls, a windshield supported on the edge of said panel adjacent said cowl wall, and a grille covering the inlet opening, of a ventilator attachment comprising an elongated body having an end wall at each end with the portion between said end walls curved longitudinally correspondingly to the transverse curvature of the cowl, said body being arranged so that the end walls extend transversely across said inlet opening with one of the edges of said curved portion closely adjacent said windshield and the curved portion projecting forwardly and upwardly over the grille and defining a scoop into which air will be channeled for passage through said grille into said conduit, an outwardly directed flange on the lower edge of each of said end walls, first bolts extending downwardly through and having heads overlying the flanges for passage into an adjacent portion of the vehicle; second bolts intermediate opposite ends of the ventilator body, said second bolts including heads overlying the ventilator body, the shanks of the last named bolts being bent and being extended through the grille of the automotive vehicle ventilator, and nuts threaded on the lower ends of the first and second bolts for drawing the heads of the several bolts downwardly to thereby engage the attachment fixedly against movement relative to said vehicle portion and grille respectively.

2. In an automobile, the combination with a cowl having a depending wall, an instrument panel inwardly of and spaced from said cowl depending wall, a fire wall on the edge of said panel adjacent said cowl wall and forming with the cowl wall a conduit having an inlet opening between said cowl and fire walls, a windshield supported on the edge of said panel adjacent said cowl wall, an upwardly extending trim strip forwardly of the edge of said panel supporting said windshield, and a grille covering the inlet opening, a ventilator attachment comprising an elongated body having an end wall at each end with the portion between said end walls curved longitudinally correspondingly to the transverse curvature of the cowl, said body being arranged so that the end walls extend transversely across said inlet opening with one of the edges of said curved portion adjacent to and bearing against said trim strip and the curved portion projecting forwardly and upwardly over the grille and defining a scoop into which air will be channeled for passage through said grille into said conduit, and means securing the end walls and said one edge of said curved portion of said body in position over said inlet opening.

References Cited in the file of this patent

UNITED STATES PATENTS

| | | |
|---|---|---|
| 1,183,670 | Riker | May 16, 1916 |
| 1,402,647 | Petry | Jan. 3, 1922 |
| 2,223,709 | Wickstrom et al. | Dec. 3, 1940 |
| 2,232,108 | Giacomini | Feb. 18, 1941 |
| 2,367,904 | Ulrich | Jan. 23, 1945 |
| 2,696,154 | Eaton | Dec. 7, 1954 |